United States Patent
Ilinich et al.

(10) Patent No.: US 12,109,646 B2
(45) Date of Patent: Oct. 8, 2024

(54) METHODS OF FORMING AND STAMPING TAILOR FRICTION STIR WELDED BLANKS WITH ENHANCED EDGE STRETCH

(71) Applicant: Ford Global Technologies, LLC, Dearborn, MI (US)

(72) Inventors: Andrey M. Ilinich, Novi, MI (US); Michael William Danyo, Trenton, MI (US); Feng Ren, West Bloomfield, MI (US); Ryan Hoffman, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/191,275

(22) Filed: Mar. 28, 2023

(65) Prior Publication Data
US 2023/0234162 A1 Jul. 27, 2023

Related U.S. Application Data

(62) Division of application No. 16/779,966, filed on Feb. 3, 2020, now Pat. No. 11,618,098.

(51) Int. Cl.
B21D 22/02 (2006.01)
B23K 20/12 (2006.01)
B23K 103/10 (2006.01)

(52) U.S. Cl.
CPC .......... B23K 20/122 (2013.01); B21D 22/02 (2013.01); B23K 2103/10 (2018.08)

(58) Field of Classification Search
None
See application file for complete search history.

(56) References Cited

U.S. PATENT DOCUMENTS

| | | | |
|---|---|---|---|
| 4,827,100 A * | 5/1989 | Frings | B23K 26/32 219/121.64 |
| 5,283,415 A * | 2/1994 | Nishi | B23K 26/26 219/121.64 |
| 7,922,067 B2 * | 4/2011 | Stevenson | B21D 35/006 228/171 |
| 8,387,852 B2 * | 3/2013 | Bevans | B23K 20/1225 228/2.1 |
| 8,683,836 B2 * | 4/2014 | Golovashchenko | B21D 22/10 72/466.8 |
| 9,604,311 B2 * | 3/2017 | Evangelista | B23K 9/235 |
| 2001/0052561 A1 * | 12/2001 | Wollaston | B23K 20/122 244/132 |
| 2004/0176863 A1 * | 9/2004 | Ren | B21D 37/20 700/98 |
| 2006/0191978 A1 * | 8/2006 | Barnes | B23K 20/122 228/112.1 |
| 2014/0154521 A1 * | 6/2014 | Kwon | B23K 26/32 219/121.64 |
| 2017/0326613 A1 * | 11/2017 | Yokoi | B23K 26/38 |
| 2017/0341122 A1 * | 11/2017 | Di Serio | B60B 3/041 |
| 2021/0046577 A1 * | 2/2021 | Ehling | B23K 11/163 |

\* cited by examiner

*Primary Examiner* — Devang R Patel
(74) *Attorney, Agent, or Firm* — Burris Law, PLLC

(57) ABSTRACT

A stamped part includes a first blank, a second blank, and a weld joining the first blank to the second blank. The weld includes opposing ends. At least one of the opposing ends of the weld is recessed from adjacent edges of the first and second blanks.

20 Claims, 6 Drawing Sheets

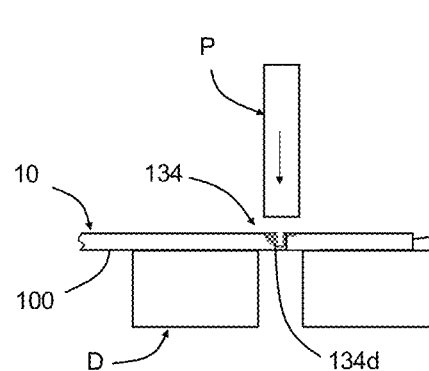
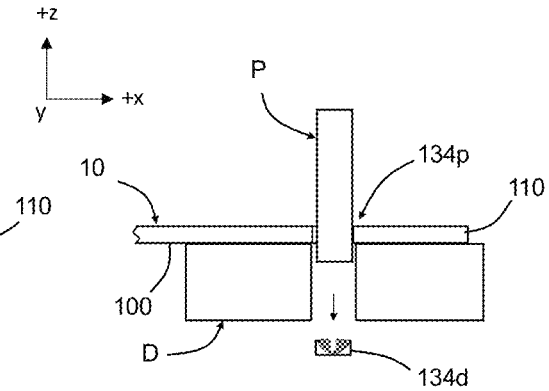
FIG. 6A    FIG. 6B
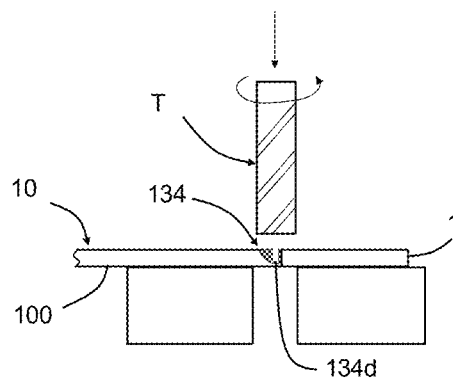
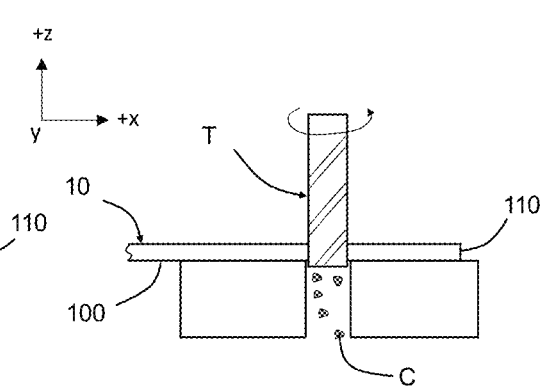
FIG. 7A    FIG. 7B
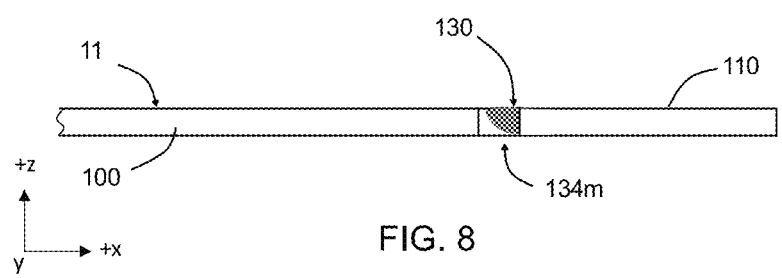
FIG. 8

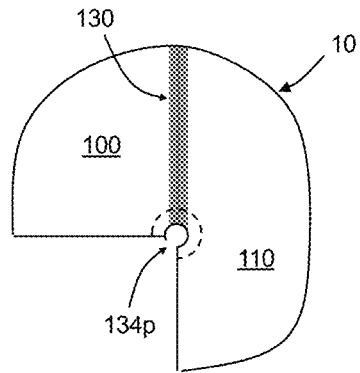
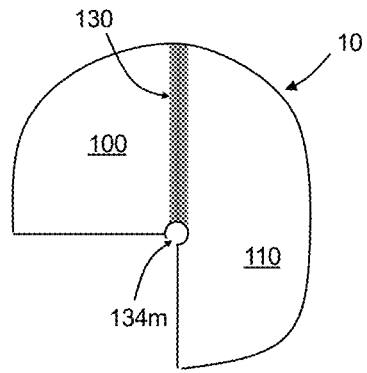
FIG. 11A    FIG. 11B
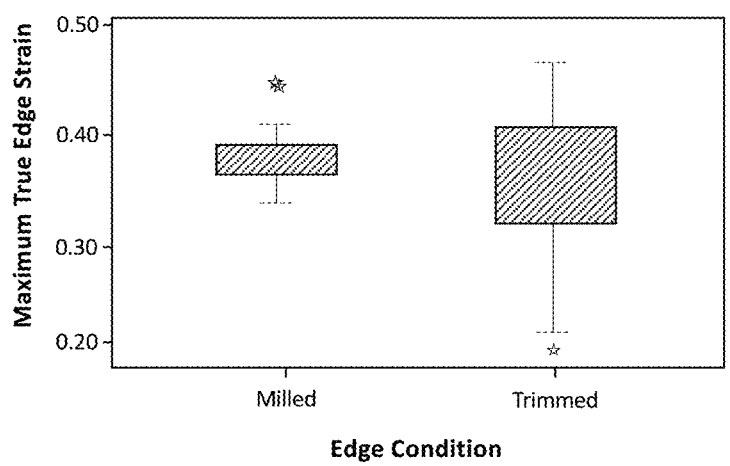
FIG. 12

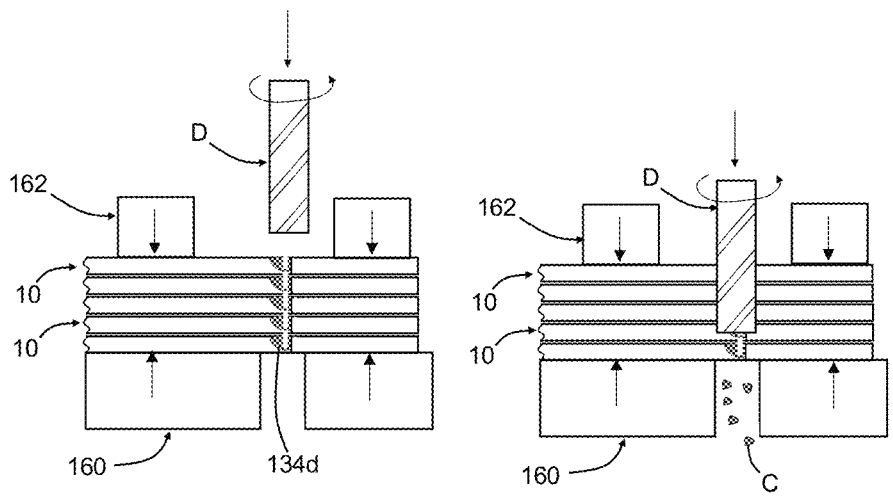
FIG. 13A
FIG. 13B
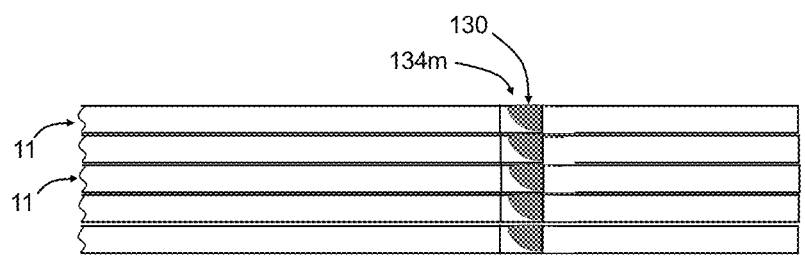
FIG. 14

METHODS OF FORMING AND STAMPING TAILOR FRICTION STIR WELDED BLANKS WITH ENHANCED EDGE STRETCH

CROSS-REFERENCE TO RELATED APPLICATION

This application is a divisional application of U.S. patent application Ser. No. 16/779,966 filed Feb. 3, 2020 and titled "METHODS OF FORMING AND STAMPING TAILOR FRICTION STIR WELDED BLANKS WITH ENHANCED EDGE STRETCH", the contents of which are incorporated herein by reference in its entirety.

FIELD

The present disclosure relates to stamping of tailor welded blanks, and particularly to stamping of tailor welded blanks formed by friction stir welding.

BACKGROUND

The statements in this section merely provide background information related to the present disclosure and may not constitute prior art.

A tailor welded blank is typically a semi-finished flat piece of metal formed from two or more blanks welded together. The two or more blanks can be made from different alloys and/or have different thicknesses, coatings and/or material properties, and thereby provide flexibility in the production of semi-flat pieces of metal that are stamped to form various parts and components. For example, tailor welded steel blanks are widely used in the automotive industry.

Aluminum or aluminum alloy tailor welded blanks are desirable, however obtaining acceptable weld quality between two or more aluminum or aluminum alloy blanks using traditional welding methods can be challenging.

The present disclosure addresses the issues of forming tailor welded aluminum blanks, among other issues related to manufacturing stamped parts from tailor welded aluminum blanks.

SUMMARY

In one form of the present disclosure, a stamped part includes a first blank, a second blank, and a weld joining the first blank to the second blank. The weld includes opposing ends. At least one of the opposing ends of the weld is recessed from adjacent edges of the first and second blanks.

In other features, the stamped part includes a region of residual plastic deformation at the at least one of the opposing ends of the weld and further in a surrounding portion of the first and second blanks. The stamped part is stamped in a direction perpendicular to the first and second blanks. The stamped part is formed by welding the first blank to the second blank to form a tailor welded blank, and by removing a portion of the at least one of the opposing ends of the weld from the tailor welded blank to form a finished tailor welded blank such that the at least one of the opposing ends of the weld is recessed from the adjacent edges of the first and second blanks. The stamped part is further formed by stamping the finished tailor welded blank in a direction perpendicular to the first and second blanks. The removing is performed by moving a machining tool in a direction perpendicular to the first and second blanks. The removing is performed by punching the portion of the at least one of the opposing ends of the weld. The stamped part includes a recessed portion at the at least one of the opposing ends of the weld and in a surrounding portion of the first and second blanks. The weld is formed by friction stir welding (FSW). The first blank and the second blank are aluminum alloy blanks, are flat pieces of metal, and may have the same or different thickness.

In another form of the present disclosure, a stamped part includes a first blank, a second blank, and a weld joining the first blank to the second blank. The weld includes opposing ends. The stamped part is formed by: welding the first blank to the second blank to form a tailor welded blank; removing at least one of the opposing ends of the weld from the tailor welded blank such that the at least one of the opposing ends of the weld is recessed from adjacent edges of the first and second blanks to form a finished tailor welded blank; and stamping the finished tailor welded blank into the stamped part in a direction perpendicular to the first and second blanks.

In other features, the stamped part further includes a recessed portion at the at least one of the opposing ends of the weld. The recessed portion is plastically deformed during the stamping of the finished tailor welded blank into the stamped part. The first blank and the second blank are flat pieces of metal. The first blank and the second blank are aluminum alloy blanks. The removing is performed by moving a machining tool in a direction perpendicular to the first and second blanks.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 6A shows the tailor welded blank in FIG. 5 before a punch removes the FSW stop spot from the friction stir weld;

FIG. 6B shows the tailor welded blank in FIG. 6A after the punch in FIG. 6A removes the FSW stop spot from the friction stir weld;

FIG. 7A shows the tailor welded blank in FIG. 5 before a milling tool removes the FSW stop spot from the friction stir weld according to one form of the present disclosure;

FIG. 7B shows the tailor welded blank in FIG. 7A with the milling tool removing the FSW stop spot from the friction stir weld;

FIG. 8 shows a side view of the tailor welded blank in FIGS. 6A and 7A after the FSW stop spot has been removed from the friction stir weld;

FIG. 11A shows a top view of the tailor welded blank in FIG. 5 after the FSW stop spot has been removed from the friction stir weld by shearing;

FIG. 11B shows a top view of the tailor welded blank in FIG. 5 after the FSW stop spot has been removed from the friction stir weld by machining;

FIG. 12 is a graph showing maximum true edge strain for tailor FSW blanks with milled edges and tailor FSW blanks with trimmed (sheared) edges;

FIG. 13A shows a side view of a plurality of tailor welded blanks before a milling tool removes a plurality of FSW stop spots from a plurality of friction stir welds according to the teachings of the present disclosure;

Figure 1:
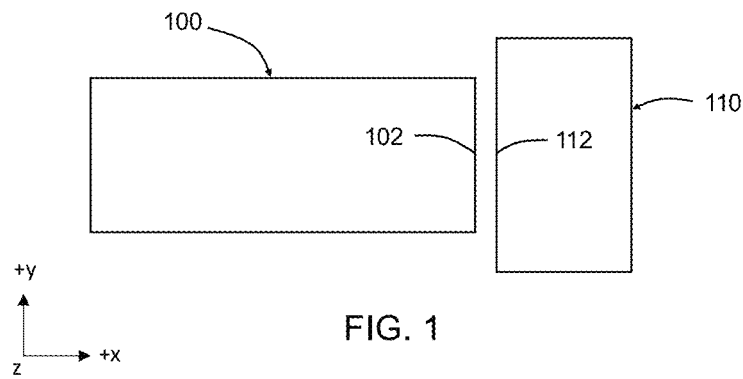
FIG. 1 is a top view of a first blank and a second blank to be joined together to form a tailor welded blank.

FIG. 13B shows a side view of the plurality of tailor welded blanks in FIG. 13A with the milling tool removing the plurality of FSW stop spots from the plurality of friction stir welds according to the teachings of the present disclosure; and FIG. 14 is a side view of the plurality of tailor welded blanks in FIG. 13A after the plurality of FSW stop spots have been removed from the plurality of friction stir welds according to the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
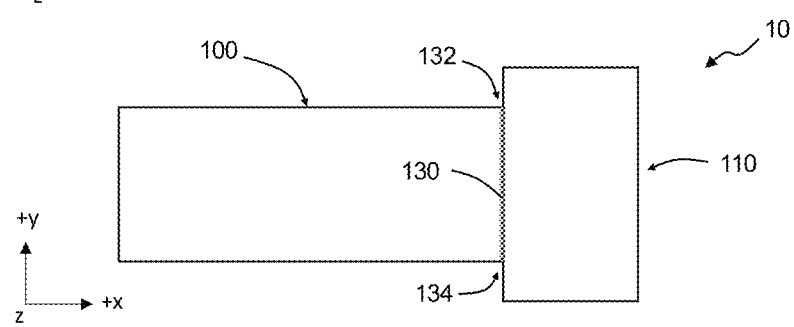
FIG. 2 is a top view of a tailor welded blank formed from the first blank and the second blank in FIG. 1.

Referring to FIG. 1, a first blank 100 and a second blank 110 used to form a tailor welded blank 10 shown in FIG. 2 are shown. The first blank 100 has a welding edge or surface 102 that is joined to a welding edge or surface 112 of the second blank 110 with a weld 130 shown in FIG. 2. Also, referring to FIG. 2, the weld 130 has a weld start spot 132 where welding of the first blank 100 to the second blank 110 begins (i.e., the beginning of the weld 130) and a weld stop spot 134 where welding of the first blank 100 to the second blank 110 ends (i.e., the end of the weld 130). As used herein, the term "blank" refers to a generally flat piece of metal used to form a stamped part. In some variations of the present disclosure, the blanks are made from aluminum or aluminum alloys and the tailor welded blank 10 is made by friction stir welding the first blank 100 and the second blank 110 together as discussed in greater detail below.

Figure 3:
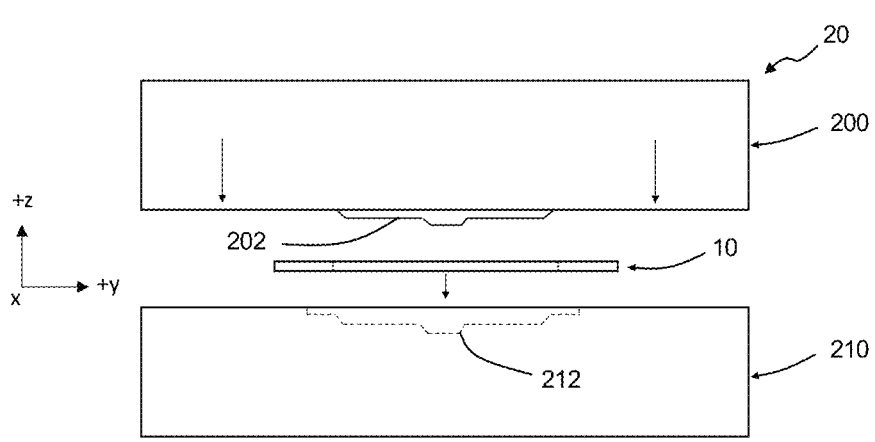
FIG. 3 shows stamping of the tailor welded blank in FIG. 2.
Figure 4:
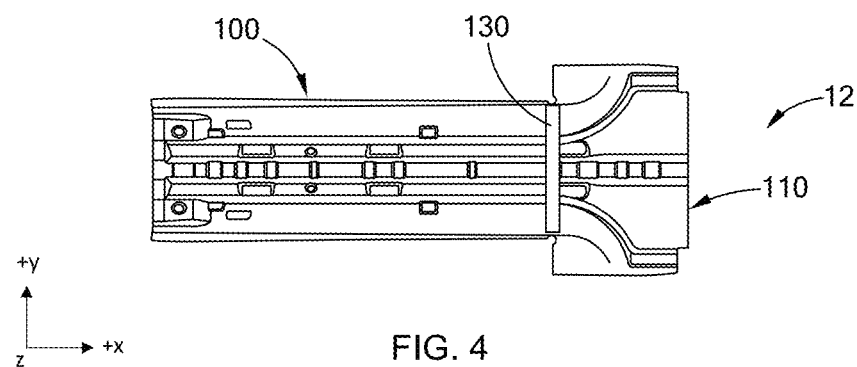
FIG. 4 is a top view of the stamped tailor welded blank formed in FIG. 3.

Referring now to FIGS. 3 and 4, an upper (+z direction) die 200 and a lower (-z direction) die 210 is shown in FIG. 3 and a stamped part 12 is shown in FIG. 4. In the example, shown, the upper die 200 has a forming surface 202 and the lower die 210 has a complimentary die cavity 212. In another example (not shown), the lower die 210 has a forming surface and the upper die 200 has a complimentary die cavity. In still another example (not shown), the upper die 200 and/or the lower die 210 employ a combination of a forming surface and a die cavity. It should be understood that the tailor welded blank 10 is positioned between the upper and lower dies 200, 210 (FIG. 3), and the upper die 200 and the lower 210 are moved or displaced relative to each other such that the forming surface 210 and die cavity 212 form the stamped part 12 (FIG. 4) from or out of the tailor welded blank 10. As shown in FIG. 4, the tailor welded blank 10 (FIG. 3), including the weld 130 (FIG. 3), is subjected to deformation (i.e., plastically deformation) and has a desired amount of ductility such that failure of the tailor welded blank 10 (FIG. 3) during stamping does not occur.

Figure 5:
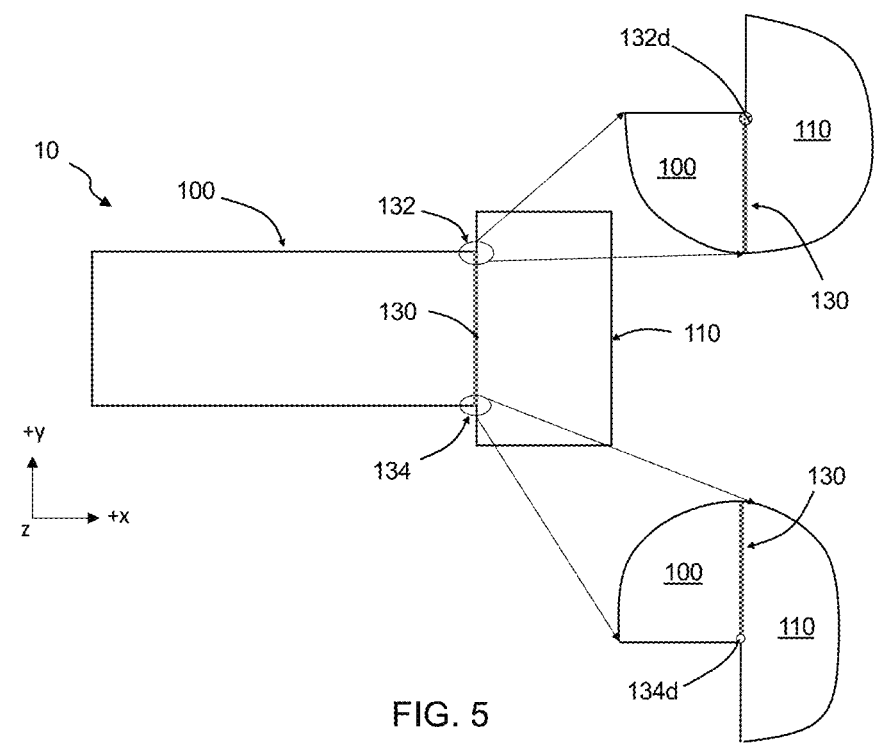
FIG. 5 is the tailor welded blank in FIG. 2 formed by friction stir welding (FSW) with a FSW start spot at the beginning and a FSW stop spot at the end of a friction stir weld joining the first blank to the second blank.

Referring now to FIG. 5, in some variations of the present disclosure the start spot 132 of the weld 130 can include a weld defect 132d and/or the stop spot 134 of the weld 130 can include a weld defect 134d. For example, in at least one variation the weld 130 is a friction stir weld 130 with a FSW start spot 132 and a FSW stop spot 134. Non-limiting examples of the weld defects 132d, 134d include unfused material, tunnel defects, flash defects, kissing bond defects, cracks and voids, among others. It should be understood that the weld defect 132d and/or the weld defect 134d can limit or reduce the amount of deformation of the weld 130 and the tailor welded blank 10 during stamping with the stamping press 20. That is, the weld defect 132d and/or the weld defect 134d can result in cracking of the weld 130 and/or the tailor welded blank 10 during the stamping process. Accordingly, it can be desirable to remove the weld defects from a FSW start spot and/or a FSW stop spot of a friction stir weld used to form a tailor welded blank.

Referring now to FIGS. 6A and 6B, removal of the weld defect 134d from the FSW stop spot 134 using a punch P and a die D is shown. Particularly, the punch P is used to shear away and remove the FSW stop spot 134, thereby removing the weld defect 134d. However, and as discussed in greater detail below, removing the FSW stop spot 134 (and the FSW start spot 132 if applicable) using the punch P and die D (i.e., via shearing) results in a region of residual plastic deformation 134p in the surrounding blank and weld material. Also, the residual plastic deformation reduces the amount of deformation the weld 130 and the tailor welded blank 10 can tolerate or be subjected to during a stamping process before failure occurs.

Figure 9:
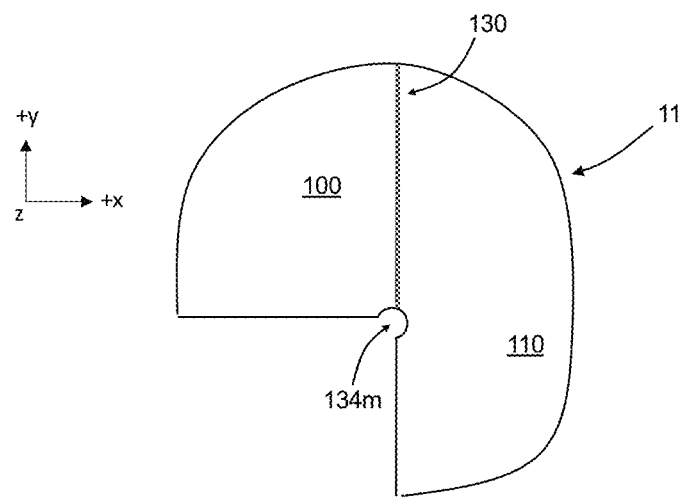
FIG. 9 shows a top view of the tailor welded blank in FIG. 8.

Referring now to FIGS. 7A and 7B, in some variations of the present disclosure the defect 134d is removed with a machining operation using a machining tool D (e.g., a drill bit or milling tool). Particularly, the machining tool T is used to drill down (-z direction) and cut or machine out the FSW stop spot 134 from the tailor welded blank 10, thereby removing the weld defect 134d (e.g., in the form of chips 'C') such that a finished tailor welded blank 11 with a deformation-free weld stop region 134m is formed as shown in FIGS. 8 and 9. It should be understood that the FSW start spot 132 and defect 132d, if applicable, are removed in a similar manner with the machining tool T.

Figures 10A, 10B:
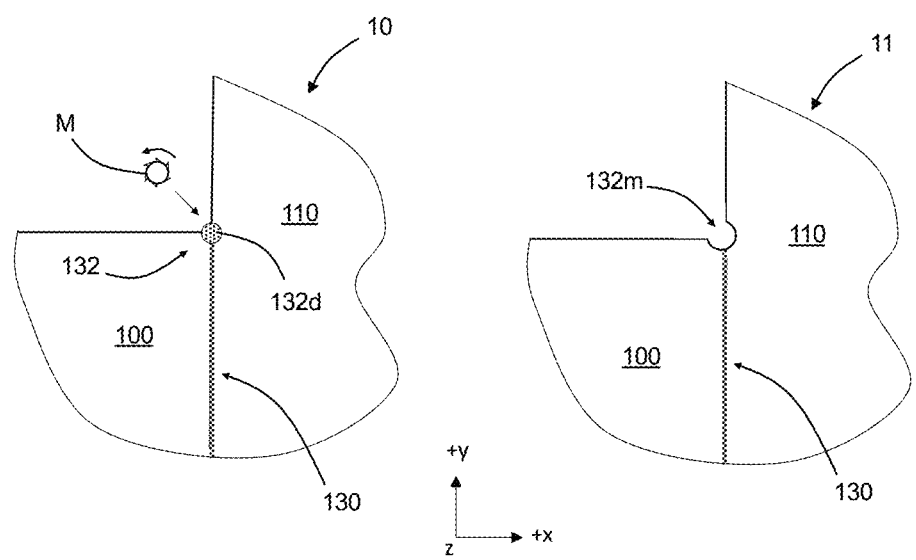
FIG. 10A shows the tailor welded blank in FIG. 5 before a milling tool removes the FSW start spot from the friction stir weld according to another form of the present disclosure.
FIG. 10B shows the tailor welded blank in FIG. 10A after the milling tool removes the FSW start spot from the friction stir weld.

While FIGS. 7A and 7B show a machining tool T drilling down into the FSW stop spot 134 to remove the defect 134d, i.e., the machining tool T moves generally perpendicular (z direction) to the plane (x-y plane) of the tailor welded blank 10, in some variations of the present disclosure a machining tool moves generally parallel to the plane (x-y plane) of the tailor welded blank 10 in order to remove a weld defect as shown in FIGS. 10A and 10B. Particularly, a milling tool 'M' rotates about the z-axis shown in the figures and moves parallel to the plane of the tailor welded blank 10 (FIG. 10A) to remove or machine out the FSW start spot 132 and form the finished tailor welded blank 11 shown in FIG. 10B. It should be understood that the weld defect 132d is removed and a deformation-free weld start region 132m (FIG. 10B) is formed. It should also be understood that the defect 134d is removed in a similar manner with the milling tool M.

While FIGS. 7A-7B and 10A-10B show the FSW stop spot 134 and the FSW start spot 132, respectively, being removed from the weld 130 using the machining tool T and the milling tool M, respectively, in some variations of the present disclosure, the FSW start spot 132 and/or the FSW stop spot 134 is removed using the punch P and die D, and then residual plastic deformation formed in the surrounding material of the weld 130 and the tailor welded blank 10 is removed with the machining tool T and/or milling tool M. That is, in some variations of the present disclosure a method of forming stamped parts includes removing weld defects with a shearing (i.e., trimming) process and then removing residual plastic deformation resulting from the shearing process with a machining process.

Not being bound by theory, removing the FSW start spot 132 with shearing results in region 134p of residual plastic deformation in the surrounding weld 130 and blank 100, 110 material as indicated by the region 134p bounded by the dotted line shown in FIG. 11A. In contrast, removing the FSW start spot 132 (or similarly the FSW stop spot 134) with a machining process or technique results in no region of residual plastic deformation (i.e., less than 1 micrometer (μm) with more than 0% plastic deformation resulting from removal of a FSW defect and referred to herein as "0% plastic deformation") in the surrounding weld 130 and blank 100, 110 material as indicated in FIG. 11B.

Referring now to FIG. 12, results of testing maximum true edge strain of tailor welded blanks (formed by FSW) as a function of edge condition is shown. Particularly, tensile samples were formed from 6HS2-T4 aluminum alloy sheet with a thickness of 2.7 millimeters (mm). Samples used for "Milled" and "Trimmed" tensile tests were formed from two 6HS2-T4 four (4) inch by 4 inch (101.6 mm by 101.6 mm) blanks joined together using friction stir welding with the friction stir weld axis oriented perpendicular to the rolling direction of the 6HS2-T4 blanks and perpendicular to the tensile (pulling) axis of the tensile samples. The "Milled" samples had a FSW start spot and a FSW stop spot removed by milling into the blank plane a distance equal to 0.79 inches (20.1 mm) using a milling tool with a radius equal to 0.79 inches (20.1 mm). The "Trimmed" had a FSW start spot and a FSW stop spot removed by shearing a scallop or half circle with a radius of 0.79 inches (20.1 mm) from the tailor welded blanks. It should be understood that the FSW start spot and the FSW stop spot were removed by the milling and shearing of the tailor welded blanks. A total of thirty (30) samples for each edge condition were tensile tested and the lower and upper boundaries of the rectangles (i.e., boxes) shown in FIG. 12 correspond to the 25th and 75th percentile, respectively.

As shown in FIG. 12, the "Milled" samples subjected to tensile testing exhibited an average maximum true edge strain of about 0.38 with about a +0.03 and about a −0.04% deviation (i.e., maximum true edge strain ranging from about 0.34 to about 0.41). Also, two "Milled" samples exhibited a maximum true edge strain of about 0.45. In contrast, the "Trimmed" samples exhibited an average maximum true edge strain of about 0.36 with about a +0.11 and about a −0.15 deviation (i.e., maximum true edge strain ranging from about 0.22 to about 0.47). Also, one "Trimmed" sample exhibited a maximum true edge strain of about 0.19. It should be understood that the higher average maximum true edge strain and reduced deviation of maximum true edge strain exhibited by the "Milled" samples is a desired property of the samples that allows for enhanced formability, predictability and use of friction stir welded tailor welded blanks.

Referring now to FIGS. 13A and 13B, in some variations of the present disclosure a plurality of weld defects 134d are removed from a plurality of tailor welded blanks 10 by stacking the plurality of tailor welded blanks 10 on top of each other as shown in FIG. 13A, clamping the plurality of tailor welded blanks 10 together with clamps 160, 162, and then machining the weld defects 134d from the welds 130 as shown in FIG. 13B such that a plurality of finished tailor welded blanks 11 with deformation-free weld stop regions 134m are provided as shown in FIG. 14. It should be understood that the weld defects 134d can be removed by shearing as described above with respect to FIGS. 6A and 6B before the plurality of tailor welded blanks 10 are stacked on top of each as shown FIG. 13A and then milled as shown in FIG. 13B. It should also be understood that a plurality of weld defects 132d (FIG. 5) can be removed from a plurality of tailor welded blanks 10 in similar manner.

It should be understood from the teachings of the present disclosure that a method of forming tailor welded blanks with enhanced properties is provided. The method includes joining a first blank with a second blank using friction stir welding such that a friction stir weld joins the first blank to the second blank. A FSW start spot and/or a FSW stop spot of the friction stir weld is machined such that deformation-free regions at the FSW start spot and/or a FSW stop spot of the friction stir weld is provided and the friction stir weld exhibits enhanced ductility and predictability during stamping of the friction stir welded tailor welded blanks.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A stamped part comprising:
   a first blank;
   a second blank; and
   a weld joining the first blank to the second blank, the weld including opposing ends,
   wherein the weld is machined to remove a weld portion at at least one of the opposing ends of the weld along an entire thickness of at least one of the first and second blanks to form a cutout extending along the entire thickness of the at least one of the first and second blanks and between adjacent edges of the first and second blanks before the first blank and the second blank joined by the weld is stamped to form the stamped part.

2. The stamped part according to claim 1, further comprising a region of residual plastic deformation at the at least one of the opposing ends of the weld.

3. The stamped part according to claim 1, further comprising a region of residual plastic deformation at the at least one of the opposing ends of the weld and in a surrounding portion of the first and second blanks.

4. The stamped part according to claim 1, wherein the stamped part is stamped in a direction perpendicular to the first and second blanks.

5. The stamped part according to claim 1, wherein the stamped part is formed by welding the first blank to the second blank to form a tailor welded blank, and by removing the weld portion from the tailor welded blank to form a finished tailor welded blank such that the cutout is formed at the at least one of the opposing ends of the weld of the finished tailor welded blank.

6. The stamped part according to claim 5, wherein the stamped part is formed by stamping the finished tailor welded blank in a direction perpendicular to the first and second blanks.

7. The stamped part according to claim 5, wherein the removing is performed by moving a machining tool in a direction perpendicular or parallel to a plane of the tailor welded blank.

8. The stamped part according to claim 5, wherein the removing is performed by punching the portion of the at least one of the opposing ends of the weld.

9. The stamped part according to claim 1, wherein the cutout is formed at the at least one of the opposing ends of the weld and in a surrounding portion of the first and second blanks.

10. The stamped part according to claim 1, wherein the weld is formed by friction stir welding (FSW).

11. The stamped part according to claim 1, wherein the first blank and the second blank are aluminum alloy blanks.

12. The stamped part according to claim 1, wherein the first blank and the second blank have the same thickness.

13. The stamped part according to claim 1, wherein the first blank and the second blank have different thickness.

14. The stamped part according to claim 1, wherein the first blank and the second blank are flat pieces of metal.

15. A stamped part comprising:
a first blank;
a second blank; and
a weld joining the first blank to the second blank, the weld including opposing ends,
wherein the stamped part is formed by:
welding the first blank to the second blank to form a tailor welded blank;
removing a weld portion at at least one of the opposing ends of the weld from the tailor welded blank to form a cutout at the at least one of the opposing ends and extending along a thickness of the tailor welded blank and between adjacent edges of the first and second blanks to form a finished tailor welded blank; and
stamping the finished tailor welded blank into the stamped part in a direction perpendicular to the first and second blanks.

16. The stamped part according to claim 15, wherein a region partially surrounding the cutout is plastically deformed during the stamping of the finished tailor welded blank into the stamped part.

17. The stamped part according to claim 15, wherein the first blank and the second blank are flat pieces of metal.

18. The stamped part according to claim 15, wherein the first blank and the second blank are aluminum alloy blanks.

19. The stamped part according to claim 15, wherein the removing is performed by moving a machining tool in a direction perpendicular or parallel to a plane of the tailor welded blank.

20. A stamped part comprising:
a plurality of flat blanks; and
a plurality of welds joining the plurality of flat blanks into one integral piece,
wherein at least one of the plurality of welds is machined to remove a weld portion at at least one of opposing ends of the at least one of the plurality of welds to form a cutout extending along a thickness of at least two of the plurality of flat blanks that is joined by the at least one of the plurality of welds and adjacent edges of the at least two of the plurality of flat blanks before the plurality of flat blanks joined by the plurality of welds are stamped to form the stamped part.

* * * * *